UNITED STATES PATENT OFFICE.

ARTHUR WEINBERG, OF FRANKFORT-ON-THE-MAIN, GERMANY, ASSIGNOR TO LEOPOLD CASSELLA & CO., OF SAME PLACE.

BROWN DYE.

SPECIFICATION forming part of Letters Patent No. 535,036, dated March 5, 1895.

Application filed September 7, 1894. Serial No. 522,339. (Specimens.)

*To all whom it may concern:*

Be it known that I, ARTHUR WEINBERG, a citizen of Prussia, and a resident of Frankfort-on-the-Main, Germany, have invented new and useful Improvements in the Production of Brown Coloring-Matters, of which the following is a specification.

This invention relates to the production of a brown disazo dyestuff which is derived from the phenylamidonaphtolsulfo acid, forming the subject of my application for Letters Patent, Serial No. 522,341, filed September 7, 1894. The said dyestuff is produced by combining one molecule of a tetrazo-compound such as tetrazodiphenyl, tetrazoditolyl, &c., with one molecule of phenylamidonaphtolsulfo acid and one molecule of salicylic acid or its homologues.

In carrying out this invention I proceed for instance as follows: 9.2 kilos benzidin are tetrazotised in the known manner and combined in alkaline solution by addition of soda with 7.6 kilos salicylic acid thus forming the intermediate body. Then a solution of sixteen kilos phenylamidonaphtolsulfo acid (which is produced by phenylating the gamma-amidonaphtolsulfo acid of United States Letters Patent No. 454,645) is added. The yellow color of the intermediate body changes at once into a brown one. The mixture is allowed to stand for twenty-four hours, then boiled and filtered.

Instead of benzidin, other paradiamins, such as tolidin, ethoxybenzidin, paraphenylenediamin, &c., may be used. The salicylic acid may be replaced by its homologues.

The thus produced dyestuffs dye unmordanted cotton in an alkaline bath dark brown shades. The colors are fast to washing and especially fast to light.

Having thus described the nature of my invention and in what manner it may be performed, what I claim as new, and desire to secure by Letters Patent, is—

1. The process for producing brown disazo dyestuffs by combining the tetrazo derivatives of paradiamins such as benzidin with one molecule of phenyl-gamma-amidonaphtolsulfo acid and one molecule of an oxycarbonic acid such as salicylic acid, substantially as described.

2. The coloring matter deriving from a tetrazo compound, the phenyl-gamma-amidonaphtolsulfo acid and salicylic acid which is a dark brown powder, difficultly soluble in cold water, easily soluble both in hot water and alcohol with a brown color dissolving in concentrated sulfuric acid with a violet shade, the latter solution forming a brown precipitate by an excess of water and dyeing unmordanted cotton dark brown shades in alkaline or neutral baths substantially as described.

In testimony that I claim the foregoing as my invention I have signed my name, in presence of two witnesses, this 25th day of August, 1894.

ARTHUR WEINBERG.

Witnesses:
ALVESTO S. HOGUE,
JEAN GRUND.